Figure 1:
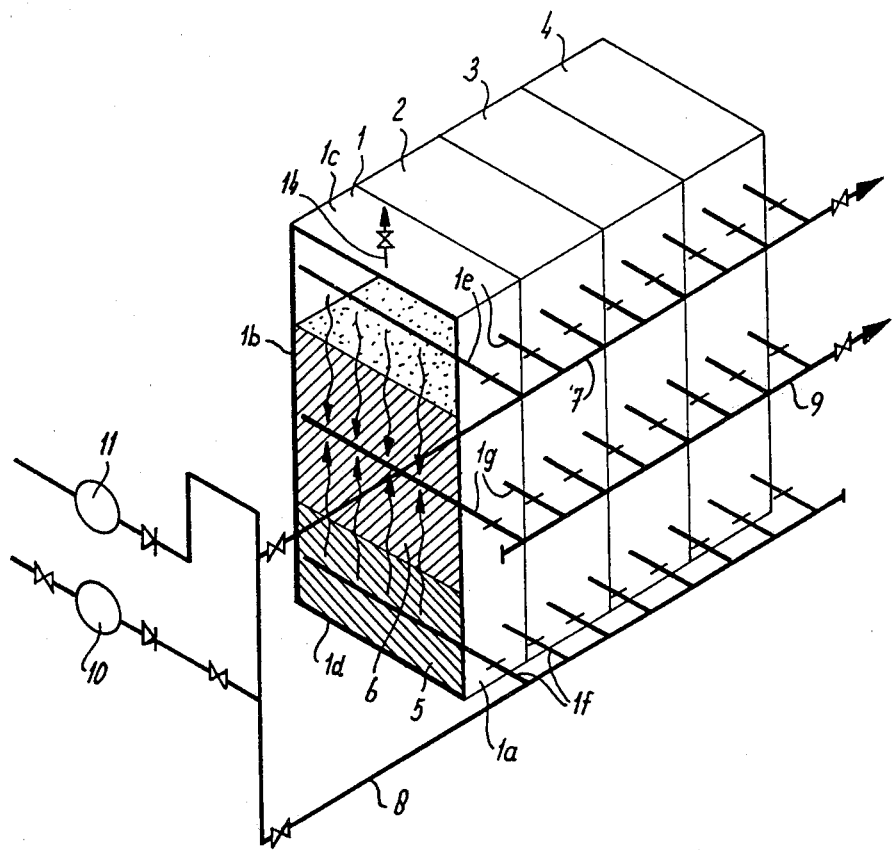

United States Patent [19]

Bastenhof

[11] 4,400,273
[45] Aug. 23, 1983

[54] PRESSURE FILTER FOR LIQUID, IN PARTICULAR WATER

[75] Inventor: Dirk Bastenhof, Langerak, Netherlands

[73] Assignee: Eco-Pool Design Limited, Great Britain

[21] Appl. No.: 310,282

[22] Filed: Oct. 9, 1981

[30] Foreign Application Priority Data

Oct. 9, 1980 [NL] Netherlands .......................... 8005591

[51] Int. Cl.³ ............................................ B01D 25/06
[52] U.S. Cl. ................................................. 210/284
[58] Field of Search ............ 210/264, 283, 284, 323.1, 210/340, 341, 488

[56] References Cited

U.S. PATENT DOCUMENTS 2,391,716 12/1945 Koupal ................................ 210/130
3,897,339 7/1975 Arndt ................................... 210/283

FOREIGN PATENT DOCUMENTS 323470 3/1903 France .
488482 3/1968 Switzerland .
1353071 5/1974 United Kingdom .

Primary Examiner—Ivars C. Cintins
Attorney, Agent, or Firm—Leydig, Voit, Osann, Mayer and Hall, Ltd.

[57] ABSTRACT

Filter for liquid, in particular water, consisting of at least two substantially equal elements (1–4) arranged side by side and assembled to one entirety, each being in form of a rectangular parallelepiped with flat rectangular walls, whereby the inlet tubes (1e, 1f) or outlet tubes (1g) are extending horizontally through the front or rear wall of each element and tubes of all elements (1–4) lying in one or more horizontal planes are connected outside of the elements (1–4) to one or more horizontal distribution or collecting conduct(s) (7,8,9) extending along all or a number of the elements (1–4), said filter is formed as a pressure filter, whereby the housing of each element (1–4) consists of flat rectangular front and rear walls and flat rectangular upper and bottom walls, the adjacent edges of the corresponding walls of adjacent elements (1–4) are connected to each other pressure-tight and rigidly and only the first and final element (1,4) being closed by flat rectangular end walls and whereby each element (1–4) separately is reinforced by external and/or internal means (1,2).

5 Claims, 3 Drawing Figures

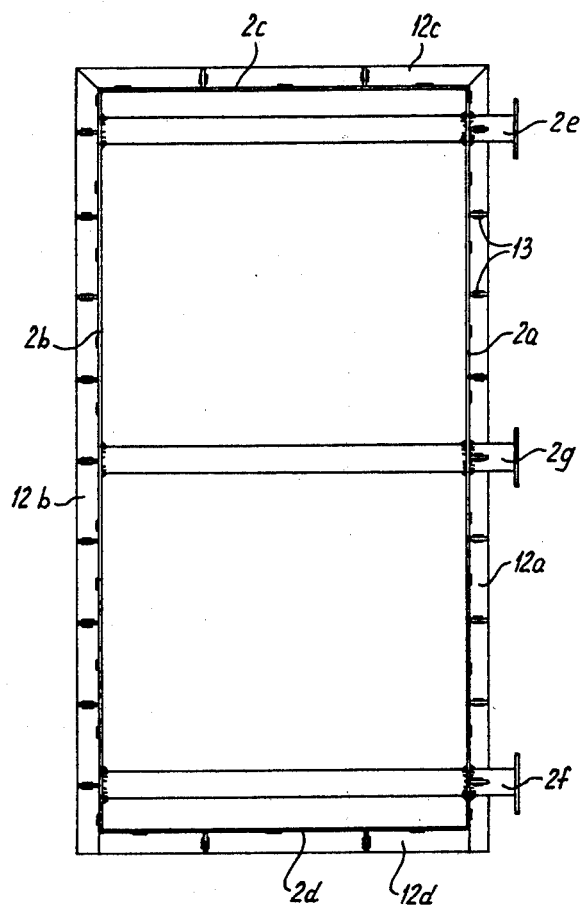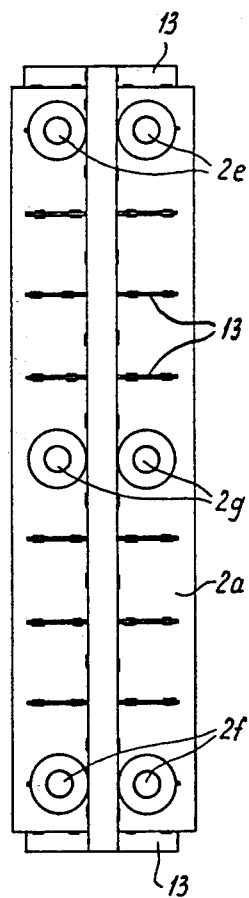

PRESSURE FILTER FOR LIQUID, IN PARTICULAR WATER

The invention relates to a filter for liquid, in particular water, consisting of at least two substantially equal volume filter elements arranged side by side and assembled together to form a single entirety, each filter element being in form of a rectangular parallelepiped with flat rectangular walls. Inlet or outlet tubes are provided extending horizontally through the front or rear wall of each element and tubes of all elements lying in one or more horizontal planes are connected outside of the elements to one or more horizontal distribution or collecting header means extending between the elements.

Such a filter is shown in U.S. Pat. No. 2,391,716. This known filter is open at the upper side and consists of a number of mutually connected rectangular tanks. The interior of these tanks is connected through openings or windows in the endwalls of each tank.

Each tank is filled with a filter material. The liquid to be filtered, especially water from a swimming pool, is supplied to the lower side of the first tank, the so-called receiving basin, flows upwardly through the filter material in this first tank and flows into the following tanks through the openings or windows. In these following tanks the water will be filtered in parallel by flowing downwardly under influence of gravity. At the lower side of these following tanks the purified water is collected and discharged to the swimming pool or to a storage tank.

It will be clear that the filter material in the first tank, the receiving basin, will catch more impurities than the following tanks. Further the endwalls between the tanks deteriorate the effect of the filter, since the water prefers to flow along these walls instead through the filter material between the endwalls.

The advantage of a filter composed of modular elements is that it can be enlarged by adding more elements. Further each element can be replaced by another element. A filter so constructed can be erected in existing buildings. For example in a swimming pool being renovated, such a filter can be readily constructed from separate element while it is not possible to supply a new large filter as a whole. Certain disadvantages of the known filter are avoided with the filter according to the invention in that the filter is formed as a pressure filter, whereby the housing of each element is pressure tight and consists of flat rectangular front and rear walls and flat rectangular upper and bottom walls, the adjacent edges of the corresponding walls of adjacent elements are connected to each other pressure-tight and rigidly and only the first and final element being closed by flat rectangular end walls and whereby each element separately is reinforced by external and/or internal means.

Pressure filters are known in practice and are formed as an upstanding cylindrical pressure vessel having an arched bottom and cap. The raw water is supplied into the vessel, passes then through the filter material and is discharged as purified water through a horizontal tube. Mostly, said filters operate according to the dual flow system, i.e. the raw water is supplied at the top and bottom and in the centre the purified water is discharged.

In order to back wash the filter material after a certain time clean water and eventually pressurized air is supplied through the lower inlet and discharged through the upper inlet, by which the particles collected in the filter material are washed away.

Although said pressure filter satisfy well in practice they are very expensive in manufacturing, because the housing consists of curved and arched plate portions in general from stainless steel and the capacity cannot be increased. A higher capacity requires a larger diameter of the vessel.

A further disadvantage is that a defect or too small pressure filter cannot be replaced by a new or bigger one in general not without partly demolishing the building in which the apparatus has been arranged.

The pressure filter according to the invention consists of a closed housing without intermediate walls, thus without influence of walls upon the filter effect. There are no intermediate walls. A receiving basin is not necessary. The water to be filtered is equally divided over the whole filter room.

Each element is built up from flat rectangular walls, which simply may be cut out from plate material and may be connected to each other.

The elements provided with reinforcing means can be transported separately to the plant, for example the engine room of a swimming pool and there can be connected to each other.

Dependent on the required capacity more or less elements can be used.

Later increase or eventually decrease of the capacity is possible without problems by adding or removing one or more elements.

Each element constitutes by the reinforcing means a rigid entirety, which can be simply transported and manipulated as a kind of container.

Preferably the reinforcing means are formed by a frame consisting of straight pieces of angle beam connected to each other into a rectangle extending around the centre of the front and rear wall and upper and lower wall of the element and of pices of angle beam or strip transversely of the rectangle.

Thus, also said frame can be assembled from usually commercially available parts.

According to a preferred embodiment of the invention the inlet and outlet tubes extend between opposite rear or front walls of each element and are connected rigidly to both of the walls for reinforcing each element. Then, the tubes form with the frame the reinforcement of each element.

In order to cover the entire area of the filter material further, preferably at both sides of the rectangular frame inlet and outlet tubes are arranged.

In order to have the filter according to the invention to operate according to the dual flow system the inlet tubes are arranged near the upper and lower wall of each element and the outlet tube or outlet tubes approximately half-way therebetween.

The invention will be explained by reference to the drawings which show in:

FIG. 1 a perspective schematic view of a pressure filter according to the invention built up from a number of elements in which the front element is in cross-section;

FIG. 2 a front-view of one of the intermediate elements; and

FIG. 3 a side-view of the element according to FIG. 2.

The filter according to the invention consists in present case of four substantially equal volume elements 1, 2, 3 and 4. Said number is dependent on the desired capacity.

Each element comprises flat rectangular walls. From the element 1 the front wall is indicated with 1a, the rear wall with 1b, the upper wall with 1c and the bottom wall with 1d.

Each of the elements 1 and 4 has yet a flat rectangular end wall not shown and closing the filter at the front and rear.

In the element 1 and also in the other elements at the top two parallel inlet tubes 1e extend and at the lower side two parallel inlet tubes 1f.

The two outlet tubes are indicated with 1g and run approximately half-way between the inlet tubes 1e and 1f.

At the bottom side, the elements are filled with support layers 5 from for example gravel upon which one or more layers 6 from for example sand seats.

The inlet tubes 1e are connected to the distribution conduct 7 and the inlet tubes 1f to a distribution conduct 8.

The outlet tubes 1g are connected to a collecting header 9 leading to a collecting tank (not shown) for purified water or swimming pool. Eventually, the collecting header can be connected to distribution headers of a subsequent filter device, when the purification should be carried out in more stages.

A pump is referred by 10 and a fan by 11. Further, several shut off valves are shown being not described in detail, because they deal with the operation of the filter, said operation being known.

For the sake of completeness the operation will be described shortly.

Water to be purified is supplied through the pump 10 to the distribution headers 7 and 8 and therefrom to the inlet tubes 1e and 1f and to the corresponding tubes in the other elements. As the arrows in FIG. 1 indicate the raw water thereby flows downwards and upwards through the filter material 6 and is captured as purified water by the outlet tubes 1g and 2g and so on and flows through the collecting header 9 to a storage for purified water or for example directly to a swimming pool.

When the filter material 6 should be back washed clean or at least slightly purified water is supplied by the pump 10 to the tubes 1f, 2f and so on and eventually air from the fan 11.

The filter material 6 is passed in upwards direction and the impurity particles are drained through the tubes 1e, 2e and so on and the conduct 7 to the sewer.

Self-evident during filtration and backwashing predetermined shut off valves should be shut off and other opened.

The construction of each element appears the best from FIG. 2 and 3 in which for example the element 2 is shown.

Around the walls 2a, 2b, 2c and 2d in its centre a rectangular frame extends built up from straight pieces of angle beam or the like indicated with 12a, 12b, 12c and 12d with transverse beams or strips 13.

Said angle beams 12a, 12b, 12c and 12d and the transverse beams or strips 13 are connected to the walls 2a, 2b, 2c and 2d by welding or the like.

The tubes 2e, 2f and 2g are rigidly connected to the walls 2a and 2b and eventually to the transverse members 13.

In this way each eleent is a rigid entirety which can be transported to the plant and connected there to the other elements by welding the adjacent edges of the walls or the like.

The frame 12a, 12b, 12c, 12d and 13 constitutes an external reinforcement and the tubes 2e, 2f and 2g an internal reinforcement of the element, by which in spite of the fact that plain walls are used the element withstands the maximum internal overpressure of approximately $2-3 \times 10^5$ Pascal.

The front and rear elements, in this case elements 1 and 4, are yet provided with flat end walls in the factory.

In said end walls one or more closable man-holes not shown are provided through which the support material 5 and the filter material 6 can be inserted.

For backwashing yet a venting 14 is provided.

As the filter according to the invention has a rectangular base the occupied floor area is used more profitable than with an upstanding cylindrical pressure vessel. A further advantage of the rectangular base area is that the flow picture of the water is uniform.

If the sewer cannot process the quantity of washwater it is possible to subdivide the filter in a number of compartments, i.e. between groups of elements partitions are positioned so that the compartments can be washed one by one.

It is simply possible to connect the filter devices according to the invention in series or parallel.

I claim:

1. A filter for liquid comprising a plurality of substantially equal volume elements arranged side by side and assembled together, each being in the form of a totally closed rectangular parallelepiped pressure tight housing with flat rectangular front, rear, upper and bottom walls and containing filter material, and having a set of inlet tubes connected by header means outside said filter and a set of outlet tubes connected by header means outside said filter, said inlet and outlet tubes extending horizontally through front or rear walls of each element, means connecting the housings of adjacent filter elements to each other, and means reinforcing walls of each element separately against internal outwardly acting pressure from liquid supplied under pressure to the element through said inlet tubes.

2. Pressure filter according to claim 1 in which said reinforcing means of each element are formed by a frame comprising straight pieces of angle beam connected to each other into a rectangle, said rectangle extending around the centre of the front and rear wall and the top and bottom wall of the element, and further pieces of angle beam or strip transversely of the rectangle.

3. Pressure filter according to claim 1 in which said inlet and outlet tubes extend between the opposite rear and front walls of each element and are connected rigidly to both said walls for reinforcing each element.

4. Pressure filter according to claim 1 in which inlet and outlet tubes are arranged to enter both front and rear walls of said elements.

5. Pressure filter according to claim 1 in which said inlet tubes are arranged near the upper and bottom walls of each element and the outlet tubes are arranged substantially half-way therebetween.

* * * * *